# 3,407,194
GON-5(10)-EN-3β-OLS

Donald P. Strike, Philadelphia, Daniel M. Teller, King of Prussia, and Herchel Smith, Wayne, Pa., assignors to American Home Products Corporation, New York, N.Y., a corporation of Delaware
No Drawing. Filed Sept. 26, 1966, Ser. No. 581,745
4 Claims. (Cl. 260—239.55)

ABSTRACT OF THE DISCLOSURE

This invention concerns a four step process for synthesizing gon-5(10)-en-3β-ols which are useful intermediates in the preparation of hormonally active 10β-methyl-13β-polycarbonalkylgon-4-en-3-ones.

---

This invention relates to a novel process for the preparation of compositions of matter classified in the art of steroidal chemistry as gonenols.

The present invention in its principal process aspect resides in the concept of oxidizing a gon-5(10)-en-3-one to form a mixture of 5α,10α-epoxygonan-3-one and 5β,10β-epoxygonan-3-one, reducing said 3-ketoepoxide mixture to produce the corresponding 5α,10α-epoxygonan-3α-ol and 5β,10β-epoxygonan-3β-ol which are then separated, and deoxygenating said isolated 3β-hydroxy-epoxide to afford an appropriate gon-5(10)en-3β-ol.

The tangible embodiments of the known compositions, the gon-5(10)en-3β-ols, prepared by this process possess the inherent general physical properties of being crystalline solids. Examination of the compounds produced according to the hereinafter described process reveals upon nuclear magnetic resonance, ultraviolet and infrared spectrographic analysis, spectral data confirming the molecular structure hereinbefore set forth. The aforementioned physical characteristics, taken together with the nature of the starting materials, the mode of synthesis confirm the molecular structure of the compounds prepared by the process of this invention.

The tangible embodiments prepared by the process of the present invention possess the inherent applied use characteristic of being valuable intermediates in the preparation of hormonally active 10β-methyl-13β-polycarbonalkylgon-4-en-3-ones which procedure is described in copending application U.S. Ser. No. 551,893, filed on May 23, 1966.

The process of the present invention, as exemplified in making a specific compound, is illustrated schematically as follows:

The process of the present invention will now be generally described so as to enable a person skilled in the art of chemistry to utilize it.

The oxidation reaction is effected by admixing an appropriate 13-alkylgon-5(10)en-3-one (I) with an acid of the group consisting of perphthalic acid, perbenzoic acid and metachloroperbenzoic acid, in a reaction-inert organic solvent, for a period of about five minutes to about one hour at a temperature from about 10° C. to about 30° C. Preferably, this reaction is conducted with metachloroperbenzoic acid in benzene at about room temperature, for about ten minutes. After the oxidation reaction is complete, the resulting 13-alkyl-5,10-epoxygonan-3-one (II) which is a mixture of 13-alkyl-5α,10α-epoxygonan-3-one and 13-alkyl-5β,10β-epoxygonan-3-one is obtained by conventional means, such as, neutralization with an alkali metal hydroxide, carbonate or bicorbonate and subsequent concentration by evaporation.

Selective reduction of the 3-keto group in the above prepared 13-alkyl-5,10-epoxygonan-3-one (II) may be effected under mild reducing conditions. This reaction may suitably be conducted in an alkanol by contact with an alkali metal borohydride at about −70° C. to −50° C. for a period of about one to about three hours. Preferably, this reaction is conducted with sodium borohydride in methanol at −70° C. for about two hours. When the reduction is complete, the resulting mixture 13-alkyl-5,10-epoxygonan-3(ξ)-ol (III) which contains a mixture of 13-alkyl-5α,10α-epoxygonan-3α-ol and 13-alkyl-5β,10β-epoxygonan-3β-ol is recovered by standard procedures, for example, acidification, concentration, aqueous reconstitution, extraction with a water immiscible organic solvent, alkaline washing, drying and concentration.

Separation of the above 13-alkyl-5,10-epoxygonan-3-(ξ)-ol (III) is effected by chromatography or fractional crystallization. Preferably, this separation is accomplished by eluting said mixture on a silica or alumina column with a polar organic solvent, such as, benzene, toluene, xylene and benzene-ether mixtures. Other suitable chromatographic media and eluants to accomplish this separation will readily suggest themselves to one skilled in the chemical art. In this manner, the desired insomer, 13-alkyl-5β,10β-epoxygonan-3β-ol (IV) is efficiently separated. Purification may be further effected by recrystallization from a suitable solvent, e.g. acetone-hexane.

Deoxygenation of the above separated 13-alkyl-5β,10β-epoxygonan-3β-ol (IV) is accomplished by contacting said isomer with a solution containing an alkali metal iodide, an alkali metal acetate, glacial acetic acid and water, in the presence of zinc dust, at about room temperature for about one hour. When the deoxygenation reaction is com-

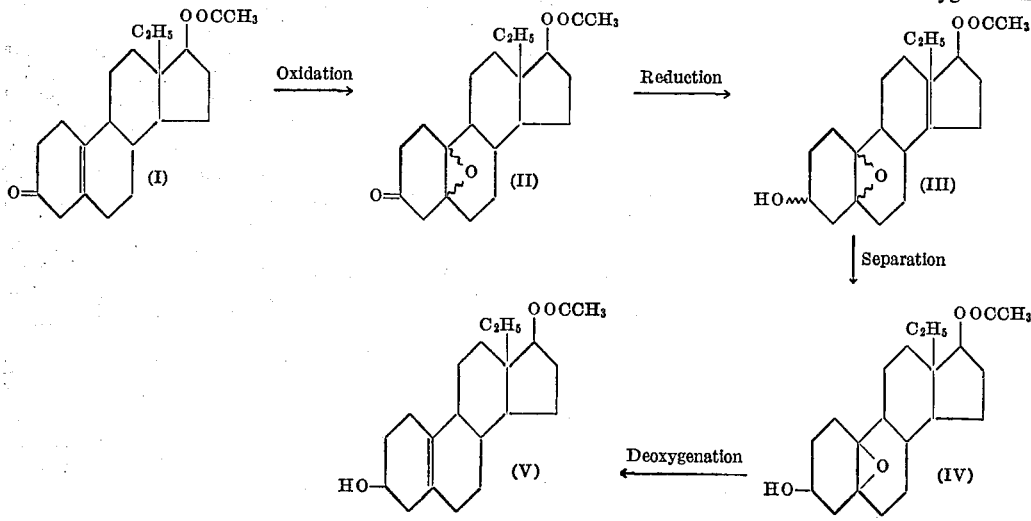

plete, the resulting 13-alkylgon-5(10)en-3β-ol (V) is separated by routine chemical methods, such as, extraction, concentration, and crystallization.

The 13-alkylgon-5(10)en-3-ones employed as starting materials in the process of this invention are prepared by the process described in copending application U.S. Ser. No. 540,930, filed on Apr. 7, 1966. By reaction-inert organic solvent as employed herein is meant an organic solvent which dissolves the reactants but will not prevent or interfere with their interaction. For example, some such solvents are benzene, toluene, xylene, ether and saturated alkanes, e.g. hexane. Other equally suitable solvents will readily suggest themselves to those skilled in the art. The reaction times and temperatures employed above are not critical and simply represent convenient reaction times and temperatures consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. The amount of solvent used in the aforesaid reactions is not critical, it being only necessary to use a sufficient amount of solvent to provide a reaction medium for the particular reactants.

It will be apparent to those skilled in the art that while the process has been specifically described only for compounds wherein the 13-alkyl group is ethyl, the 13-alkyl group can be of varying chain length, such as, for example propyl, isopropyl, butyl, isobutyl, pentyl, etc., even cetyl, and for the process of the invention when such groups are present in the starting material, they will be correspondingly present in the intermediates and in the final products and when so used, the process is the full equivalent of the process particularly described and claimed.

It will be apparent to those skilled in the art that the starting compounds can bear groups unaffected by the process reactions, such as, for example but not limited thereto, 6-, 7-, or 16-methyl, 11- or 16-hydroxy, or 17-hydroxyl-17-alkyl, or the starting compounds can bear labile groups which can be protected to allow selective reduction at the 3-position, such as, for example but not limited thereto, the 11-oxo, 17-acetyl or hydroxyacetyl, or 17-hydroxy-17-acetyl or hydroxyacetyl, which can be protected by ketalization, and these variations for the process of the invention, except for the limitation expressed above, are full equivalents of the process as particularly described.

It will also be apparent to those skilled in the art of chemistry that if the 17-position of the starting material is substituted only with hydrogen or with a group inert to the subsequent process reactions that protection of the 17-position is not required, and that when a starting material thus substituted is employed in the process of the invention, the variation is the full equivalent of the process as particularly described and claimed.

Example I

A solution of 40.2 g. dl-13-ethyl-17β-hydroxygon-5(10)-en-3-one, acetate in 750 ml. of benzene is treated with a solution of 36 g. of 80% metachloroperbenzoic acid in one liter of benzene and the mixture is stirred at room temperature for ten minutes. The mixture is then washed with 5% sodium hydroxide, water, dried and evaporated to obtain 42.9 g. of an oil containing a mixture of dl-13-ethyl - 17β-hydroxy-5α,10α-epoxygon-3-one, acetate and dl - 13-ethyl-17β-hydroxy-5β,10β-epoxygon-3-one, acetate.

A solution of the above 42.9 g. of epoxide mixture in two liters of methanol is stirred, cooled to —70° C., treated with 21.5 g. of sodium borohydride and stirred at —70° C. for two hours. The excess sodium borohydride is then decomposed by the cautious addition of 75 ml. of acetic acid over two hours, adding one ml. portion every five minutes in the beginning to avoid excess foaming. After removing the Dry Ice-acetone bath, the mixture is stirred and warmed to room temperature, concentrated to 500 ml., diluted with water and extracted with chloroform. After washing with 5% potassium bicarbonate and water, the extract is dried and evaporated to afford 44.6 g. of an oily solid which is chromatographed on neutral alumina and eluted with benzene to yield 16.5 g. of dl-13-ethyl-5β,10β-epoxygon-3β,17β-diol, 17-acetate which is recrystallized twice from acetone-hexane to obtain white crystals, M.P. 126–128° C.,

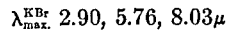

NMR: 0.95 (triplet), 2.04, 3.30, 3.48, 3.75 (multiplet), 4.70 (triplet) p.p.m. Found: C, 72.43; H, 9.14. $C_{21}H_{32}O_4$ calc'd: C, 72.38; H, 9.26.

Continued elution with 1:4 ether-benzene affords 15.9 g. of dl-13-ethyl-5α,10α-epoxygon-3α,17β-diol, 17-acetate which is recrystallized twice from acetone-hexane to afford a while solid, M.P. 155–158° C.,

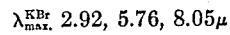

NMR: 0.95 (triplet), 2.04, 2.90 (multiplet), 3.59 (one proton multiplet), 4.67 (triplet) p.p.m. Found: C, 72.34; H, 8.87. $C_{21}H_{32}O_4$ calc'd: C, 72.38; H, 9.26.

A solution of 24 g. of sodium iodide and 7.8 g. of anhydrous sodium acetate in 185 ml. acetic acid and 15 ml. of water is stirred and cooled in an ice bath and treated with 24 g. of zinc dust. To this stirring mixture there is added 15.1 g. of dl-13-ethyl-5β,10β-epoxygon-3β,17β-diol, 17-acetate in portions over fifteen minutes along with 150 ml. acetic acid and 10 ml. water. Thereafter, the ice bath is removed and the mixture stirred at room temperature for one hour, filtered and concentrated to 100 ml. The resulting slurry is dissolved in ether, washed with water, 10% sodium bisulfite, and water, then dried and evaporated. The crude product is dissolved in benzene and passed through a short alumina (Neutral-Act. 3) column, evaporated and crystallized from ether-hexane to obtain 9.9 g. of dl-13-ethylgon-5(10)en-3β,17β-diol, 17-acetate which is recrystallized twice from ether-hexane to obtain white crystals, M.P. 118–120° C.,

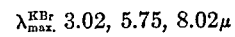

NMR: 0.93 (triplet), 2.03, 2.10, 2.37 (one proton multiplet), 4.72 (triplet) p.p.m. Found: C, 75.59; H, 9.45. $C_{21}H_{32}O_3$ calc'd: C, 75.86; H, 9.70.

Example II

A solution of 25.0 g. of dl-13,17α-diethyl-17β-hydroxygon-5(10)en-3-one in 625 ml. of benzene is treated with a solution of 20.0 g. of 80% metachloroperbenzoic acid in 625 ml. of benzene and the mixture is stirred at room temperature for twenty minutes. The mixture is washed with 5% aqueous sodium hydroxide, aqueous saturated sodium bicarbonate, water, dried over anhydrous sodium sulfate and evaporated in vacuo to afford 28.0 g. of colorless solid, M.P. 90–105° C., a mixture of dl-13,17α-diethyl - 17β - hydroxy-5α,10α-epoxygon-3-one and dl-13, 17α-diethyl-17β-hydroxy-5β,10β-epoxygon-3-one.

To a stirring solution of the above 28.0 g. of epoxide in 1,250 ml. of methanol at —70° C., there is added 28.0 g. of sodium borohydride and stirring is continued at —70° C. for one hour. The excess sodium borohydride is decomposed by the cautious addition of excess glacial acetic acid. Thereafter, water is added and the resulting precipitate filtered to yield 24.0 g. of colorless solid, M.P. 110–125° C., which is recrystallized from acetonitrile (ca. 200 ml.) to give 11.0 g. of the crystalline dl-13,17α-diethyl-5α,10α-epoxygon-3α,17β - diol, M.P. 150–180° C., thereafter, the mother liquors are evaporated to yield 10.5 g. of the dl-13,17α-diethyl-5β,10β-epoxygon-3β,17β-diol as a glass.

To a stirring solution of 16.0 g. of sodium iodide and 5.2 g. of sodium acetate (anhydrous) in 125 ml. of glacial acetic acid and 16 ml. of water in an ice bath, there is added 16.0 g. of zinc dust. To the stirred mixture there is added a solution of 10.0 g. of dl-13,17α-diethyl-5β,10β-epoxygon-3β,17β-diol in 100 ml. of glacial acetic acid over five minutes. The ice bath is removed and the mixture stirred at room temperature for one hour. Thereafter, benzene is added to the mixture which is then filtered and the filtrate washed with brine, 5% aqueous sodium hydroxide, water, dilute aqueous sodium bisulfite, water and then evaporated in vacuo to give 9.0 g. of yellow colored glass. Crystallization from ether-hexane affords 2.1 g. of unreacted starting material. The mother liquors are evaporated and the residue crystallized from methanol to give 3.9 g. of colorless $dl$-13,17α-diethyl-5(10)en-3β,17β-diol, M.P. 100–107° C.;

$$\lambda_{max.}^{KBr} \ 3.10\mu$$

NMR: 4.02 p.p.m., half band width 12 mm. Found: C, 76.16; H, 10.49. $C_{21}H_{34}O_2 \cdot \frac{3}{4}CH_3OH$ calc'd: C, 76.20; H, 10.89.

The subject matter which the applicants regard as their invention is pointed out and particularly claimed as follows:

1. A process for preparing a 13-alkylgon-5(10)en-3β-ol, comprising:
    (a) oxidizing a 13-alkylgon-5(10)en-3-one to form a mixture of a 13-alkyl-5α,10α-epoxygonan-3-one and a 13-alkyl-5β,10β-epoxygonan-3-one by addition of oxygen across the 5(10)-unsaturation;
    (b) selectively reducing the 3-keto group in said mixture with an alkali metal borohydride at a temperature range from about −70° C. to about −50° C. to form a 13-alkyl-5α,10α-epoxygonan-3α-ol and a 13-alkyl-5β,10β-epoxygonan-3β-ol;
    (c) separating said latter mixture by chromatography or fractional crystallization and deoxygenating the 5(10)-epoxy group in the isolated 13-alkyl-5β,10β-epoxygonan-3β-ol by contact with an alkali metal iodide, an alkali metal acetate, glacial acetic acid and water in the presence of zinc dust.

2. A process to prepare a 13-alkylgon-5(10)en-3β-ol which comprises:
    (a) oxidizing a 13-alkylgon-5(10)en-3-one by contact with an acid selected from the group consisting of monoperphthalic, perbenzoic and metachloroperbenzoic acids, in a reaction inert organic solvent, for a period of about five minutes to about one hour at a temperature range from about 10° C. to about 30° C. to form a mixture of a 13-alkyl-5β,10β-epoxygonan-3-one and a 13-alkyl-5α,10α-epoxygonan-3-one;
    (b) selectively reducing said mixture with an alkali metal borohydride, in an alkanol, at a temperature range from about −70° C. to about −50° C. for a period of about one to about three hours to form a 13-alkyl-5α,10α-epoxygonan-3α-ol and a 13-alkyl-5β,10β-epoxygonan-3β-ol;
    (c) separating said latter mixture by chromatography or fractional crystallization and deoxygenating the isolated 13-alkyl-5β,10β-epoxygonan-3β-ol by contact with an alkali metal iodide, an alkali metal acetate, glacial acetic acid and water, in the presence of zinc dust, at about room temperature for about one hour.

3. A process as described in claim 2 to prepare $dl$-13-ethylgon-5(10)en-3β,17β-diol, 17-acetate which comprises:
    (a) oxidizing $dl$-13-ethyl-17β-hydroxygon-5(10)en-3-one, 17-acetate by contact with metachloroperbenzoic acid in benzene for about ten minutes at about room temperature to form a mixture of $dl$-13-ethyl-17β-hydroxy-5α,10α-epoxygon-3-one, acetate and $dl$-13-ethyl-17β-hydroxy-5β,10β-epoxygon-3-one, acetate;
    (b) selectively reducing said mixture with sodium borohydride in methanol at about −70° C. for about two hours to form a mixture of $dl$-13-ethyl-5α,10α-epoxygon-3α,17β-diol, 17-acetate and $dl$-13-ethyl-5β,10β-epoxygon-3β,17β-diol, 17-acetate;
    (c) chromatographically separating said mixture and deoxygenating said isolated $dl$-13-ethyl-5β,10β-epoxygon-3β,17β-diol, 17-acetate by contact with sodium iodide, sodium acetate, glacial acetic acid and water, in the presence of zinc dust, at about room temperature for about one hour.

4. A process as described in claim 2 to prepare $dl$-13,17α-diethyl-5(10)en-3β,17β-diol which comprises:
    (a) oxidizing a $dl$-13,17α-diethyl-17β-hydroxygon-5(10)en-3-one by contact with metachloroperbenzoic acid in benzene for about twenty minutes at about room temperature to form a mixture of $dl$-13,17α-diethyl-17β-hydroxy-5α,10α-epoxygon-3-one and $dl$-13,17α-diethyl-17β-hydroxy-5β,10β-epoxygon-3-one;
    (b) selectively reducing said mixture with sodium borohydride in methanol at about −70° C. for about one hour to form a mixture of $dl$-13,17α-diethyl-5α,10α-epoxygon-3α,17β-diol and $dl$-13,17α-diethyl-5β,10β-epoxygon-3β,17β-diol;
    (c) separating said mixture by fractional crystallization and deoxygenating said $dl$-13,17α-diethyl-5β,10β-epoxygon-3β,17β-diol by contact with sodium iodide, sodium acetate, glacial acetic acid and water, in the presence of zinc dust, at about room temperature for about one hour.

References Cited

Cross, A. D., et al.: Journ. Org. Chem., 29, 8 (1964), pp. 2195–2200.

ELBERT L. ROBERTS, *Primary Examiner.*

E. G. LOVE, *Assistant Examiner.*